(12) United States Patent
Wang et al.

(10) Patent No.: US 8,626,220 B2
(45) Date of Patent: Jan. 7, 2014

(54) DYNAMIC SPECTRUM ALLOCATION METHOD AND DEVICE

(75) Inventors: Haiguang Wang, Shenzhen (CN); Shulan Feng, Beijing (CN); Jinnan Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 283 days.

(21) Appl. No.: 13/305,382

(22) Filed: Nov. 28, 2011

(65) Prior Publication Data

US 2012/0071188 A1 Mar. 22, 2012

Related U.S. Application Data

(63) Continuation of application No. PCT/CN2010/071052, filed on Mar. 18, 2010.

(30) Foreign Application Priority Data

Jun. 3, 2009 (CN) .......................... 2009 1 0107819

(51) Int. Cl.
*H04W 72/08* (2009.01)
(52) U.S. Cl.
USPC .......................................... 455/509; 370/329
(58) Field of Classification Search
USPC ....................................................... 455/509
See application file for complete search history.

(56) References Cited

U.S. PATENT DOCUMENTS

| | | | |
|---|---|---|---|
| 5,668,828 A * | 9/1997 | Sanderford et al. .......... | 375/136 |
| 6,215,816 B1 * | 4/2001 | Gillespie et al. .............. | 375/219 |
| 6,353,604 B2 * | 3/2002 | Grimwood et al. ........... | 370/335 |
| 6,421,372 B1 * | 7/2002 | Bierly et al. .................. | 375/143 |
| 7,239,650 B2 * | 7/2007 | Rakib et al. ................... | 370/480 |
| 7,876,786 B2 * | 1/2011 | Bahl et al. ..................... | 370/478 |
| 7,929,458 B1 * | 4/2011 | Hoech et al. .................. | 370/254 |
| 7,979,076 B2 * | 7/2011 | Hui et al. ....................... | 455/450 |
| 8,160,626 B2 * | 4/2012 | Shan et al. ..................... | 455/509 |
| 8,374,619 B2 * | 2/2013 | Jones et al. .................... | 455/450 |
| 8,472,968 B1 * | 6/2013 | Kim .............................. | 455/452.2 |
| 8,488,633 B2 * | 7/2013 | Bahl et al. ..................... | 370/478 |
| 8,509,105 B2 * | 8/2013 | Kneckt et al. ................. | 370/252 |

(Continued)

FOREIGN PATENT DOCUMENTS

| | | |
|---|---|---|
| CN | 1809214 A | 7/2006 |
| CN | 1885753 A | 12/2006 |

(Continued)

OTHER PUBLICATIONS

Written Opinion of International Searching Authority dated Jun. 24, 2010 in connection with International Patent Application No. PCT/CN2010/071052, 3 pages.

(Continued)

*Primary Examiner* — Hai V Nguyen

(57) ABSTRACT

A dynamic spectrum allocation method and device are provided. The method includes: finding non-idle frequency bands in the coverage of a communication device according to information in a database; selecting a frequency band from the non-idle frequency bands as a negotiation frequency band, and sending a spectrum assignment request to an interfering device using the negotiation frequency band; and acquiring usage assignment of the interfering device, in which the usage assignment is a response to the spectrum assignment request. The technical solutions can effectively allocate dynamic spectrum resources to a communication device, and are simple to implement.

16 Claims, 8 Drawing Sheets

(56) References Cited

U.S. PATENT DOCUMENTS

| | | | |
|---|---|---|---|
| 8,509,688 B2* | 8/2013 | Rajagopal et al. | 455/41.2 |
| 8,532,041 B1* | 9/2013 | Lambert et al. | 370/329 |
| 8,571,479 B2* | 10/2013 | Banerjea | 455/41.2 |
| 2007/0117537 A1* | 5/2007 | Hui et al. | 455/405 |
| 2007/0153731 A1* | 7/2007 | Fine | 370/329 |
| 2007/0171887 A1 | 7/2007 | Waxman | |
| 2007/0232349 A1* | 10/2007 | Jones et al. | 455/552.1 |
| 2007/0281710 A1* | 12/2007 | Bai et al. | 455/452.1 |
| 2008/0109343 A1 | 5/2008 | Robinson et al. | |
| 2008/0130603 A1 | 6/2008 | Wentink et al. | |
| 2008/0151806 A1* | 6/2008 | Bereski et al. | 370/312 |
| 2008/0225687 A1* | 9/2008 | Oksman | 370/201 |
| 2009/0059856 A1* | 3/2009 | Kermoal et al. | 370/329 |
| 2009/0280748 A1* | 11/2009 | Shan et al. | 455/67.11 |
| 2011/0125905 A1* | 5/2011 | Baucke et al. | 709/226 |
| 2013/0051365 A1* | 2/2013 | Guvenc et al. | 370/331 |
| 2013/0115986 A1* | 5/2013 | Mueck et al. | 455/501 |

FOREIGN PATENT DOCUMENTS

| | | |
|---|---|---|
| CN | 101052981 A | 10/2007 |
| CN | 101064905 A | 10/2007 |
| CN | 101083825 A | 12/2007 |
| CN | 101102446 | 1/2008 |
| CN | 101154991 A | 4/2008 |
| CN | 101389071 A | 3/2009 |
| EP | 2005775 A1 | 12/2008 |
| WO | WO 2008/006315 A1 | 1/2008 |
| WO | WO 2009/023581 A1 | 2/2009 |
| WO | WO 2009/054673 A2 | 4/2009 |

OTHER PUBLICATIONS

Partial translation of Office Action dated May 9, 2013 in connection with Chinese Patent Application No. 200910107819.7.
Partial translation of Office Action dated Dec. 21, 2012 in connection with Chinese Patent Application No. 200910107819.7.
International Search Report dated Jun. 24, 2010 in connection with International Patent Application No. PCT/CN2010/071052.
Xiangpeng Jing, et al., "Spectrum Co-existence of IEEE 802.11b and 802.16a Networks Using Reactive and Proactive Etiquette Policies", Mobile Netw. Appl. (2006), May 4, 2006, p. 539-554.
Yuan Yuan, et al., "KNOWS: Cognitive Radio Networks Over White Spaces", 2007, p. 416-427.
Zuniga/Kwak, "Media Independent Coexistence", IEEE 802-SG-WhiteSpace-09/0032r2, Mar. 9, 2009, 10 pages.
"Part 16: Air Interface for Fixed and Mobile Broadband Wireless Access Systems, Improved Coexistence Mechanisms for License-Exempt Operation", Draft Amendment to IEEE Standard for Local and metropolitan area networks, Nov. 2008, 216 pages.
"Draft Standard for Wireless Regional Area Networks Part 22: Cognitive Wireless RAN Medium Access Control (MAC) and Physical Layer (PHY) specifications: Policies and procedures for operation in the TV Bands", IEEE 802.22/P802.22/D1.0, Dec. 2010, 598 pages.

\* cited by examiner

DYNAMIC SPECTRUM ALLOCATION METHOD AND DEVICE

CROSS-REFERENCE TO RELATED APPLICATIONS

This application is a continuation of International Application No. PCT/CN2010/071052, filed on Mar. 18, 2010, which claims priority to Chinese Patent Application No. 200910107819.7, filed on Jun. 3, 2009, both of which are hereby incorporated by reference in their entireties.

TECHNICAL FIELD

The present invention relates to the field of communications technologies, and in particular, to a dynamic spectrum allocation method and device.

BACKGROUND

With the development of communications technologies, wireless spectrum resources are becoming increasingly scarce. However, some spectrum resources are not well used. For example, broadcast television (TV) channels may include a certain amount of TV white space. In order to make good use of the idle resources, the idle resources can be allocated to meet communication demands of devices. During the allocation of an idle spectrum, a dynamic spectrum allocation strategy is usually adopted. Dynamic spectrum allocation means that a dynamic spectrum to be allocated does not belong to a specific device, that is, the dynamic spectrum is used by various users. When a communication device does not use the dynamic spectrum any longer, the spectrum is allocated to other devices. The same frequency band may be used by different devices at the same geographical location, which causes interference and affects the communication quality. Therefore, it is a problem to be solved on how to reasonably and dynamically allocate licenses of spectra and reduce inter-device interference.

A dynamic spectrum allocation method is provided in the prior art. In the method, a common control channel is created for each device participating in spectrum allocation, and the use of the resources is negotiated by devices demanding for the dynamic spectrum resources. A device may acquire licenses of a frequency band by detecting whether the frequency band is idle. After the licenses of the frequency band are required, the frequency band may be marked as a non-idle frequency band. Other devices may detect the device and the non-idle frequency band being used by the device, and negotiate with the device through the common control channel to request the licenses of the frequency band.

The prior art at least has the following defects. Before performing spectrum allocation negotiation, a communication device is required to detect a use situation of nearby dynamic spectrum resources and conditions of devices using the resources, and grasp a situation of interference of the devices using the resources on the communication device, which increases the complexity of spectrum negotiation of the communication device. Particularly, with the increasing number of users participating in spectrum allocation and the increasing interference, spectrum negotiation and allocation become more difficult.

SUMMARY

Embodiments of the present invention provide a dynamic spectrum allocation method and device, so as to decrease complexity of dynamic spectrum allocation.

A dynamic spectrum allocation method provided in an embodiment of the present invention includes:
  finding non-idle frequency bands in the coverage of a communication device according to information in a database;
  selecting a frequency band from the non-idle frequency bands as a negotiation frequency band, and sending a spectrum assignment request to an interfering device using the negotiation frequency band; and
  acquiring usage assignment of the interfering device, in which the usage assignment is a response to the spectrum assignment request.

A dynamic spectrum allocation method provided in an embodiment of the present invention includes:
  acquiring a spectrum assignment request, in which the spectrum assignment request includes information of a negotiation frequency band;
  determining whether to accept the spectrum assignment request according to a use time and a bandwidth of the negotiation frequency band currently being used; and
  sending usage assignment when the spectrum assignment request is accepted.

A dynamic spectrum allocation device provided in an embodiment of the present invention includes:
  a finding module, configured to find non-idle frequency bands in the coverage of a communication device according to information in a database;
  a selection module, configured to select a frequency band from the non-idle frequency bands as a negotiation frequency band, and send a spectrum assignment request to an interfering device using the negotiation frequency band; and
  a permit reception module, configured to acquire usage assignment of the interfering device, in which the usage assignment is a response to the spectrum assignment request.

A communication device provided in an embodiment of the present invention includes:
  a request reception module, configured to acquire a spectrum assignment request, in which the spectrum assignment request includes information of a negotiation frequency band;
  a determination module, configured to determine whether to accept the spectrum assignment request according to a use time and a bandwidth of the negotiation frequency band currently being used; and
  a sending module, configured to send usage assignment when the spectrum assignment request is accepted.

According to the above descriptions of the technical solutions, the embodiments of the present invention have the following advantages. A non-idle frequency band being used is selected according to information in a database, and negotiation is performed with an interfering device using the frequency band to acquire licenses of the frequency band, which effectively decreases complexity of dynamic spectrum allocation and is simple to implement.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION

The technical solutions according to the embodiments of the present invention will be clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
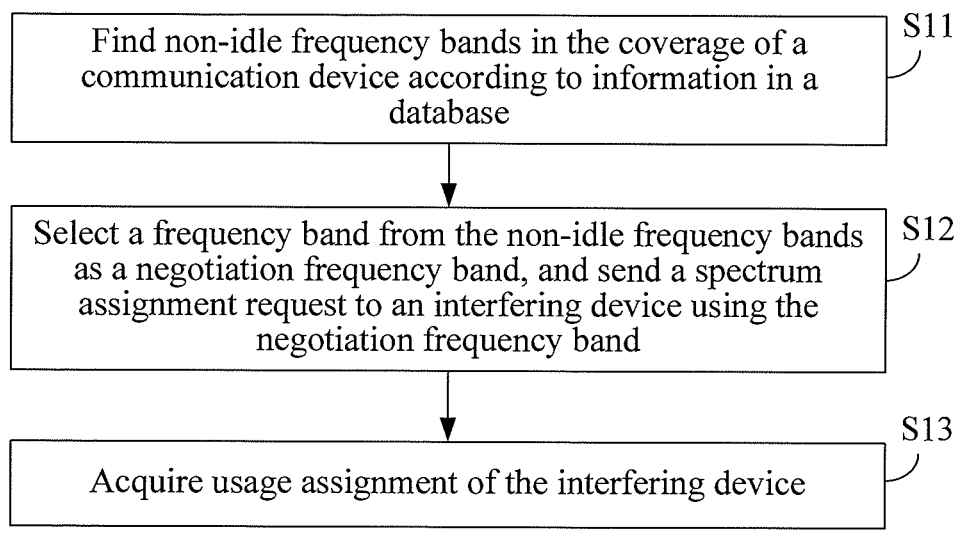
FIG. 1 is a schematic diagram of a dynamic spectrum allocation method according to Embodiment 1 of the present invention.

FIG. 1 is a schematic diagram of a dynamic spectrum allocation method according to Embodiment 1 of the present invention, and the method includes the following steps.

Step S11: Find non-idle frequency bands in the coverage of a communication device according to information in a database.

Step S12: Select a frequency band from the non-idle frequency bands as a negotiation frequency band, and send a spectrum assignment request to an interfering device using the negotiation frequency band.

Step S13: Acquire usage assignment of the interfering device, in which the usage assignment is a response to the spectrum assignment request.

In this embodiment, the non-idle frequency band being used is selected according to the information in the database, and the negotiation is performed with the interfering device using the frequency band to acquire licenses of the frequency band, which effectively decreases complexity of dynamic spectrum allocation and is simple to implement.

Furthermore, the method may further include: re-selecting a frequency band from the non-idle frequency bands as a negotiation frequency band after acquiring a reject message from the interfering device, and sending a spectrum assignment request to an interfering device using the re-selected negotiation frequency band. When the negotiation with the interfering device does not succeed, the negotiation can be performed by re-selecting a negotiation frequency band until all negotiations fail, in which case the process of the dynamic spectrum allocation can be stopped.

The spectrum allocation method can be executed not only by a management device, but also by a communication device. The management device can be connected to the communication device through a network and perform spectrum negotiation and management with the communication device. The management device may include a database, and the database stores the information of a communication device as an Identifier (ID), a geographical location, and the coverage of the communication device, a use situation of channels in the coverage, a spectrum range being used by the communication device, transmission power of the communication device, a type of an antenna of the communication device, reception sensitivity of the communication device, and an interference range of the communication device, which are not described in detail herein. The communication device may be an integrated or distributed communication device. In a common application, the communication device may be a base station.

In an implementation manner, before executing step S11, the management device may acquire a spectrum allocation request from the communication device. The spectrum allocation request may be provided by a communication device, and is configured to request the management device for spectrum resources. The management device continues the spectrum allocation negotiation after acquiring the spectrum allocation request, provides a spectrum allocation success message for the communication device after acquiring the usage assignment of the interfering device, and allocates the negotiation frequency band to the communication device. Furthermore, the management device may also update the information of the negotiation frequency band in the database thereof.

In another implementation manner, the communication device may acquire the information in the database before executing step S11. The communication device continues the spectrum allocation negotiation after acquiring the information in the database. The communication device provides a spectrum allocation success message for the management device after acquiring the usage assignment of the interfering device. The management device allocates the negotiation frequency band to the communication device after acquiring the spectrum allocation success message. The communication device accepts the negotiation frequency band allocated by the management device. Furthermore, the communication device may also send a lock request to the management device to lock the negotiation frequency band to prevent other communication devices from participating in the negotiation of the frequency band, thereby increasing the success rate of the spectrum allocation of the communication device.

Embodiment 2

Figure 2:
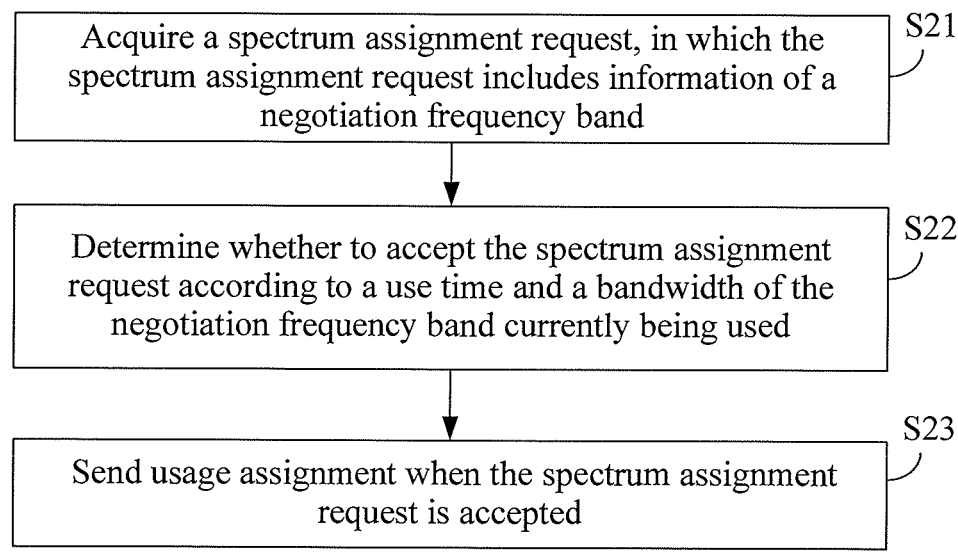
FIG. 2 is a schematic diagram of a dynamic spectrum allocation method according to Embodiment 2 of the present invention.

FIG. 2 is a schematic diagram of a dynamic spectrum allocation method according to Embodiment 2 of the present invention, and the method includes the following steps.

Step S21: Acquire a spectrum assignment request, in which the spectrum assignment request includes information of a negotiation frequency band.

Step S22: Determine whether to accept the spectrum assignment request according to a use time and a bandwidth of the negotiation frequency band currently being used.

Step S23: Send usage assignment when the spectrum assignment request is accepted.

In this embodiment, a communication device may determine whether to accept the spectrum assignment request according to the use time and the bandwidth of the negotiation frequency band currently being used by the communication device. When the time of the communication device using the negotiation frequency band exceeds a time threshold, it is required that the frequency band shall be allowed to be used by other devices, thereby preventing a communication device from occupying apart of spectrum resources for a long period of time. As such, the spectrum allocation is fair and reasonable, and demands of the spectrum from other communication devices can also be met.

In this embodiment, after acquiring the spectrum assignment request from other devices, the communication device determines whether to accept the spectrum assignment request according to the use time and the frequency bandwidth of the spectrum resources used by the communication device within a period of time, and may allow other devices to use the negotiation frequency band being used by the communication device by sending the usage assignment. When determining whether to accept the spectrum assignment request from other devices, the communication device is required to comprehensively consider the use time and the bandwidth of the frequency band resources thereof. For example, assuming that the negotiation frequency bandwidth currently being used by the communication device is $f_1$, and a time length for which the negotiation frequency band is already used is $\Delta T$, a value of a formula of $(f_1)^x \cdot (\Delta T)^y$ can be calculated, where x and y are values greater than 0. When the value of $(f_1)^x \cdot (\Delta T)^y$ is greater than a threshold Th, the communication device accepts the spectrum assignment request from other devices.

In an embodiment, the communication device may judge whether a result by multiplying the use time with the bandwidth of the negotiation frequency band currently being used is greater than a threshold; and accept the spectrum assignment request when the result by multiplying the use time with the bandwidth of the negotiation frequency band is greater than the threshold. Assuming that the frequency band currently being used by the communication device is still $f_1$, and the time length for which the frequency band is already used is still $\Delta T$, if $f_1 \cdot \Delta T \geq Th$, the communication device accepts the spectrum assignment request from other devices. That is to say, in this case the communication device is required to allow other devices to use the negotiation frequency band currently being used by the communication device. The threshold Th may be set by the institutes of the communication industry such as the Federal Communication Commission (FCC) or set by a user according to an actual situation.

It should be understood that, the communication device may determine whether to accept the spectrum assignment request according to the use time and the bandwidth of the negotiation frequency band currently being used in other implementation manners. For example, when the use time satisfies $\Delta T \geq T1$, and the negotiation frequency bandwidth satisfies $f_1 \geq F1$, the communication device accepts the spectrum assignment request; and when at least one of $\Delta T$ and $f_1$ is smaller than a preset threshold T1 or F1, the communication device may not accept the spectrum assignment request. This embodiment does not limit the specific implementation methods.

After accepting the spectrum assignment request and sending the usage assignment, the communication device stops using the negotiation frequency band, so as not to interfere with other devices. The communication device may be a fixed or mobile device.

Embodiment 3

Figure 3:
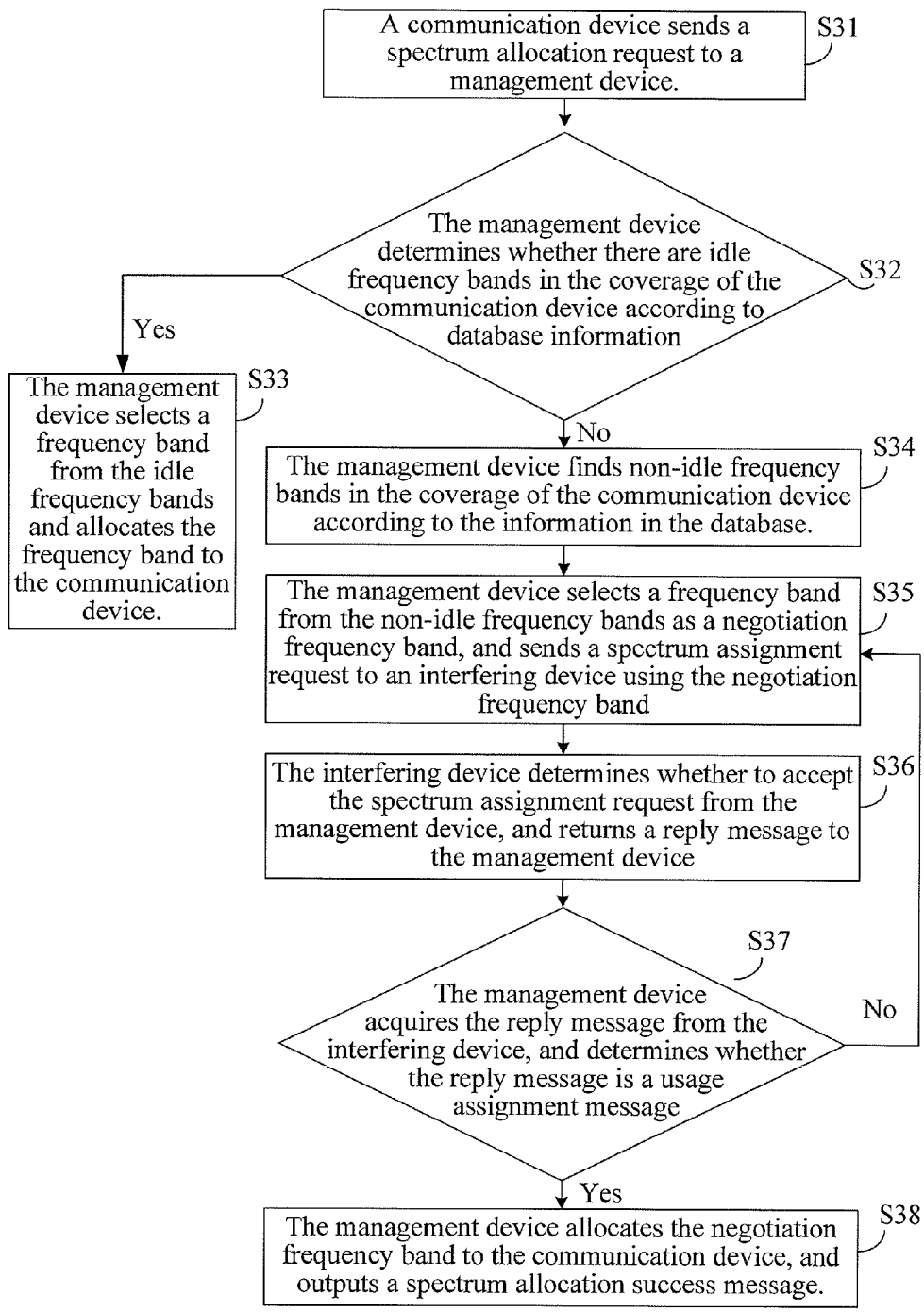
FIG. 3 is a schematic flow chart of a dynamic spectrum allocation method according to Embodiment 3 of the present invention.

FIG. 3 is a schematic flow chart of a dynamic spectrum allocation method according to Embodiment 3 of the present invention, and the method includes the following steps.

Step S31: A communication device sends a spectrum allocation request to a management device.

Figure 4:
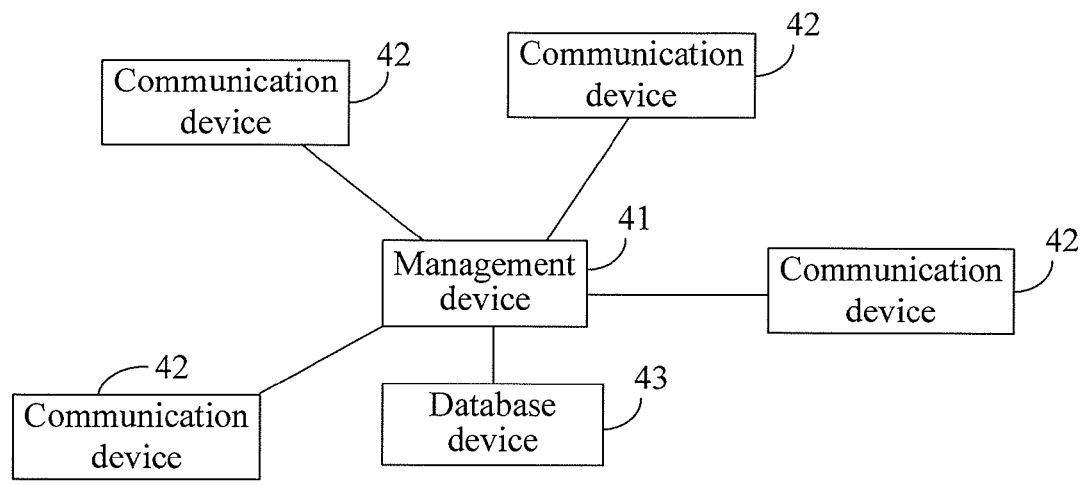
FIG. 4 is a schematic structure diagram of a communication management system according to Embodiment 3 of the present invention.

The communication device sends the spectrum allocation request to the management device when the communication device needs to use spectrum resources, and may inform the management device of a bandwidth required to be allocated when sending the spectrum allocation request. FIG. 4 is a schematic structure diagram of a communication management system according to Embodiment 3 of the present invention. A management device 41 is connected to at least one communication device 42. The management device 41 is connected to a database device 43. The management device 41 can query the database device 43 to acquire information needed by the management device 41. The communication devices 42 may be connected to each other through a network.

Step S32: The management device determines whether there are idle frequency bands in the coverage of the communication device according to database information. If there are idle frequency bands in the coverage of the communication device, the procedure proceeds to step S33; if there are no idle frequency bands in the coverage of the communication device, the procedure proceeds to step S34.

The management device queries whether there are idle frequency bands in the coverage of the communication device initiating the request by searching the information in the database. In a specific implementation manner, the management device may find a channel frequency band set in the coverage of the communication device and interfering devices of the communication device according to the information in the database. If at least one interfering device is using a frequency band in the coverage of a communication device, for the communication device, the frequency band is a non-idle frequency band. If a frequency band in the coverage of a communication device is not used by any interfering device of the communication device, for the communication device, the frequency band is an idle frequency band. It should be noted that, the idle frequency band is defined according to a situation of interference on the communication device. Even if one frequency band is being used by other devices, and the frequency band is still an idle frequency band of the communication device as long as the interference exerted by the other devices on the communication device is smaller than a threshold. If the interference exerted by the other devices using the frequency band on the communication device is greater than the threshold, the frequency band is a non-idle frequency band of the communication device. Different communication devices may have different definitions concerning whether the spectrum resources are idle resources, and the present invention is not limited thereto.

The interfering device of the communication device is a device interfering with the communications of the communication device. The interfering device may be defined according to a level of the interference on the communication device. When the interference exerted by another device on the communication device is greater than a threshold, the device is an interfering device of the communication device. The definition of the interfering device can be determined according to a specific application situation, and the key is to determine whether an interference signal of a device affects the operation of another device.

Figure 5:
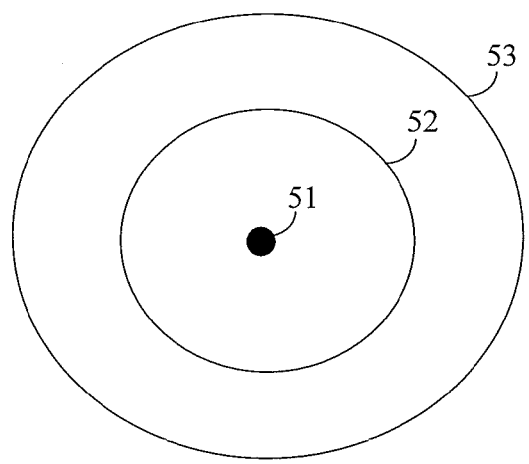
FIG. 5 is a schematic diagram of the coverage and an interference range of a communication device according to Embodiment 3 of the present invention.
Figure 6:
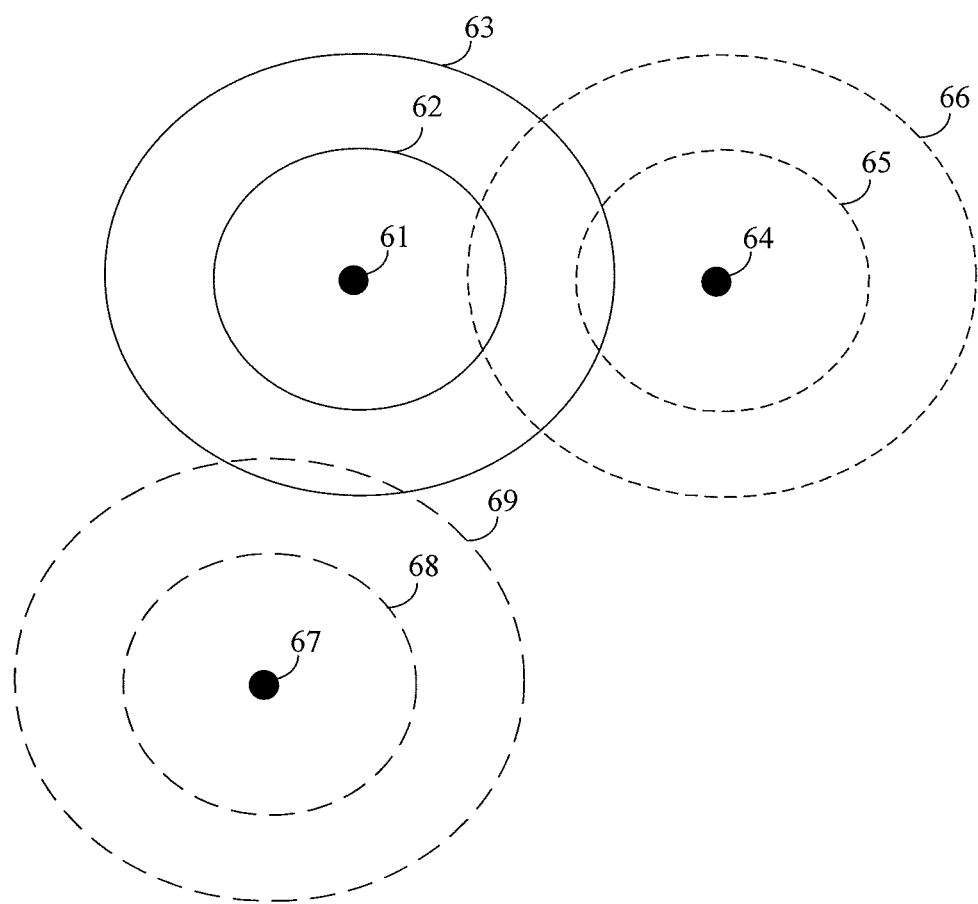
FIG. 6 is a schematic diagram of an interfering device of a communication device according to Embodiment 3 of the present invention.

In order to make the definition of the interfering device clearer, an example of a cellular communication system is given below for illustration. It should be understood that, involved methods may also be improved to be applied to other types of communication systems, for example, a distributed communication system, and the present invention is not limited thereto. FIG. 5 is a schematic diagram of the coverage and an interference range of a communication device according to Embodiment 3 of the present invention. The communication device 51 may be a base station, and a surrounding area thereof is its communication coverage 52. Service devices within the coverage can access a communication network through the communication device 51, and service devices outside the coverage 52 cannot access the communication network through the communication device 51. That is to say, within the coverage 52, the signal power of the communication device 51 needs to be larger than a threshold P1, so that the service devices thereof can clearly receive a signal from the communication device 51. The service device may be a terminal or a User Equipment (UE). FIG. 5 also shows an interference range 53 of the communication device 51. Outside the interference range 53, the signal power of the communication device 51 is smaller than a threshold P2, so as not to interfere with other devices. Normally, the threshold P1 is greater than the threshold P2; and the interference range 53 is larger than the coverage 52. It can be defined that, when the coverage of a communication device A overlaps an interference range of a communication device B, or when an interference range of the communication device A overlaps the coverage of the communication device B, the communication device A and the communication device B are interfering devices for each other. FIG. 6 is a schematic diagram of an interfering device of a communication device according to Embodiment 3 of the present invention. In FIG. 6, a communication device 61 has coverage 62 and an interference range 63; a communication device 64 has coverage 65 and an interference range 66; and a communication device 67 has coverage 68 and an interference range 69. It can be seen that the coverage 62 of the communication device 61 overlaps the interference range 66 of the communication device 64, so that the communication device 61 and the communication device 64 are interfering devices for each other. The coverage 62 of the communication device 61 and the interference range 69 of the communication device 67 do not overlap, and the interference range of the communication device 61 and the coverage 68 of the communication device 67 do not overlap either, so that the communication device 61 and the communication device 67 are not interference-related devices for each other.

The definition of the interfering device may also take into account the different types of communication devices. Normally, interference between devices of the same type is relatively small since interference prevention between the devices of the same type is considered during the design. However, usually interference prevention between devices of different types is not considered, resulting in great interference. If the coverage of a communication device overlaps an interference range or even the coverage of another communication device, but the two communication devices are of the same type, have small interference with each other, and do not affect the operation of each other, the two communication devices are not interfering devices for each other. Normally, communication interference occurs between devices of different types, but interference between devices of the same type may also exist, and the present invention is not limited thereto.

Step S33: The management device selects a frequency band from the idle frequency bands, and allocates the frequency band to the communication device.

When selecting an idle frequency band, the management device may select the idle frequency band for the communication device according to a bandwidth required to be allocated, the information of which is provided by the communication device. The management device may find multiple idle frequency bands in the database, select one frequency band with a bandwidth larger than the bandwidth required to be allocated, and allocate the selected frequency band to the communication device. It should be understood that, when only one idle frequency band exists, the communication device may determine the only idle frequency band as the frequency band to be allocated. The selected frequency band may include multiple channels C1, and each of the channels C1 may include at least one minimum sub-channel C2. If one channel C1 includes multiple minimum sub-channels C2, the multiple minimum sub-channels C2 may be consecutive or not. The minimum sub-channel may be a smallest unit of the dynamic spectrum allocation.

As stated in the above embodiment, the selected idle frequency band may already be used by other devices that do not interfere with the normal operation of the communication device. Particularly, when multiple devices of the same type as that of the communication device are also using the frequency band, interference between the multiple devices and the communication device is very small, and the communication device may share the idle frequency band with the multiple devices of the same type in a time division multiplex manner. Definitely, the number of the devices that use the same frequency band without interfering with each other in the time division multiplex manner may be limited. For example, at most three communication devices not interfering with each other can use one frequency band in the time division multiplex manner. If the number of devices using the frequency band is greater than 3, the management device does not allocate the frequency band to subsequent devices applying for the frequency band. Preferably, when selecting an idle frequency band, the management device may allocate the idle frequency band with the lowest use frequency or the idle frequency used by the fewest devices to the communication device. For example, if one idle frequency band is not used by any device, the management device may preferably allocate the frequency band to the communication device.

After allocating the selected idle frequency band to the communication device, the management device may update a use record of the idle frequency bands of the communication device or in the corresponding coverage of the communication device in the database. The management device may inform the communication device of the success of the spectrum allocation, and provide the communication device with information such as a frequency range and a use situation of the idle frequency band allocated to the communication device.

Step S34: The management device finds non-idle frequency bands in the coverage of the communication device according to the information in the database.

When the coverage of the communication device does not include any idle frequency band, the management device may find the non-idle frequency bands in the coverage of the communication device. As stated in the above embodiment, the non-idle frequency band in the coverage of the communication device is being used by at least one interfering device of the communication device. It should be understood that the number of the non-idle frequency bands meeting the requirements usually may be multiple.

Step S35: The management device selects a frequency band from the non-idle frequency bands as a negotiation frequency band, and sends a spectrum assignment request to an interfering device using the negotiation frequency band.

When the number of the non-idle frequency bands is one, the management device may directly determine the non-idle frequency band as the negotiation frequency band; and when the number of the non-idle frequency bands is multiple, the management device may select one of the frequency bands as the negotiation frequency band. The management device sends the spectrum assignment request to the interfering device using the negotiation frequency band. Preferably, the management device may acquire the number of interfering devices using the non-idle frequency bands or the use frequency of the non-idle frequency bands by the interfering devices according to the information in the database, and select a non-idle frequency band used by the fewest interfering devices or with the lowest use frequency by the interfering devices as the negotiation frequency band. The use frequency of the selected negotiation frequency band is low, which increases the probability of success of the negotiation and shortens the negotiation time.

After selecting the negotiation frequency band, the management device sends a spectrum assignment request to all interfering devices using the selected negotiation frequency band to request the interfering devices to allow the spectrum to be allocated to the communication device demanding for the spectrum.

Step S36: The interfering device determines whether to accept the spectrum assignment request from the management device, and returns a reply message to the management device.

In a specific implementation manner, after acquiring the spectrum assignment request, the interfering device determines whether to accept the spectrum assignment request according to a use time and a bandwidth of the negotiation frequency band. In an embodiment, the interfering device may determine whether a result by multiplying the use time with the bandwidth of the negotiation frequency band currently being used is greater than a threshold; and accept the spectrum assignment request when the result by multiplying the use time with the bandwidth of the negotiation frequency band is greater than the threshold. The threshold may be set according to actual applications.

After making a decision, the interfering device returns the reply message to the management device. If the interfering device accepts the spectrum assignment request, the interfering device sends a usage assignment message to allow the communication device to use the negotiation frequency band. If the interfering device rejects the spectrum assignment request, the interfering device returns a reject message to reject the communication device of using the negotiation frequency band. Furthermore, the interfering device stops using the negotiation frequency band after allowing the communication device to use the negotiation frequency band, so as not to interfere with the communication device.

Step S37: The management device acquires the reply message from the interfering device, and determines whether the reply message is a usage assignment message. If the reply message is a usage assignment message, the procedure proceeds to step S38; if the reply message is not a usage assignment message, the management device re-executes step S35.

Step S38: The management device allocates the negotiation frequency band to the communication device, and outputs a spectrum allocation success message.

After acquiring the usage assignment of the interfering device, the management device allocates the negotiation frequency band to the communication device, and updates content of the database. Normally, the management device is required to negotiate with multiple interfering devices using the negotiation frequency band, and allocate the negotiation frequency band to the communication device after receiving the usage assignment sent by the multiple interfering devices. The content of the database updated by the management device may include: the information of the negotiation frequency band and a situation of the communication device using the negotiation frequency band. The management device may output the spectrum allocation success message to inform the communication device of the success of the spectrum allocation, and the management device may also send the spectrum allocation success message to the interfering device.

In an implementation manner, the reply messages received by the management device from the multiple interfering devices include a reject message, which indicates that at least one interfering device does not allow the communication device to use the frequency band currently being used by the interfering device, and the negotiation process fails. The management device may re-select one frequency band from the non-idle frequency bands in the coverage of the communication device as the negotiation frequency band, and perform the negotiation accordingly.

The management device may negotiate multiple non-idle frequency bands in sequence, and may re-initiate the negotiation continuously if the previous negotiation is not successful. In an implementation manner, the management device may record a set $S_0$ of multiple non-idle frequency bands in the coverage of the communication device, and find in the set $S_0$ a frequency band used by the fewest interference devices or with the lowest use frequency by the interfering devices to negotiate. If the negotiation succeeds, the management device allocates the frequency band of the successful negotiation to the communication device, and if the negotiation fails, the management device deletes the frequency band from the set $S_0$, and continues to find in the set $S_0$ a frequency band used by the fewest interference devices or with the lowest use frequency by the interference devices to negotiate, until all of the frequency bands in the set $S_0$ fail in the negotiation, in which case the management device outputs a spectrum allocation failure message to the communication device.

In this embodiment, the management device finds an idle frequency band in the coverage of the communication device according to the spectrum allocation request from the communication device, and allocates the idle frequency band to the communication device. If the coverage does not include any idle frequency band, the management device may find a non-idle frequency band, negotiate with other devices using the non-idle frequency band, and allocate the frequency band of the successful negotiation to the communication device after acquiring the usage assignment of the other devices. The communication device is not required to detect a use situation of surrounding channels, the implementation is simple, and the complexity of the dynamic spectrum allocation is decreased.

Embodiment 4

Figure 7A:
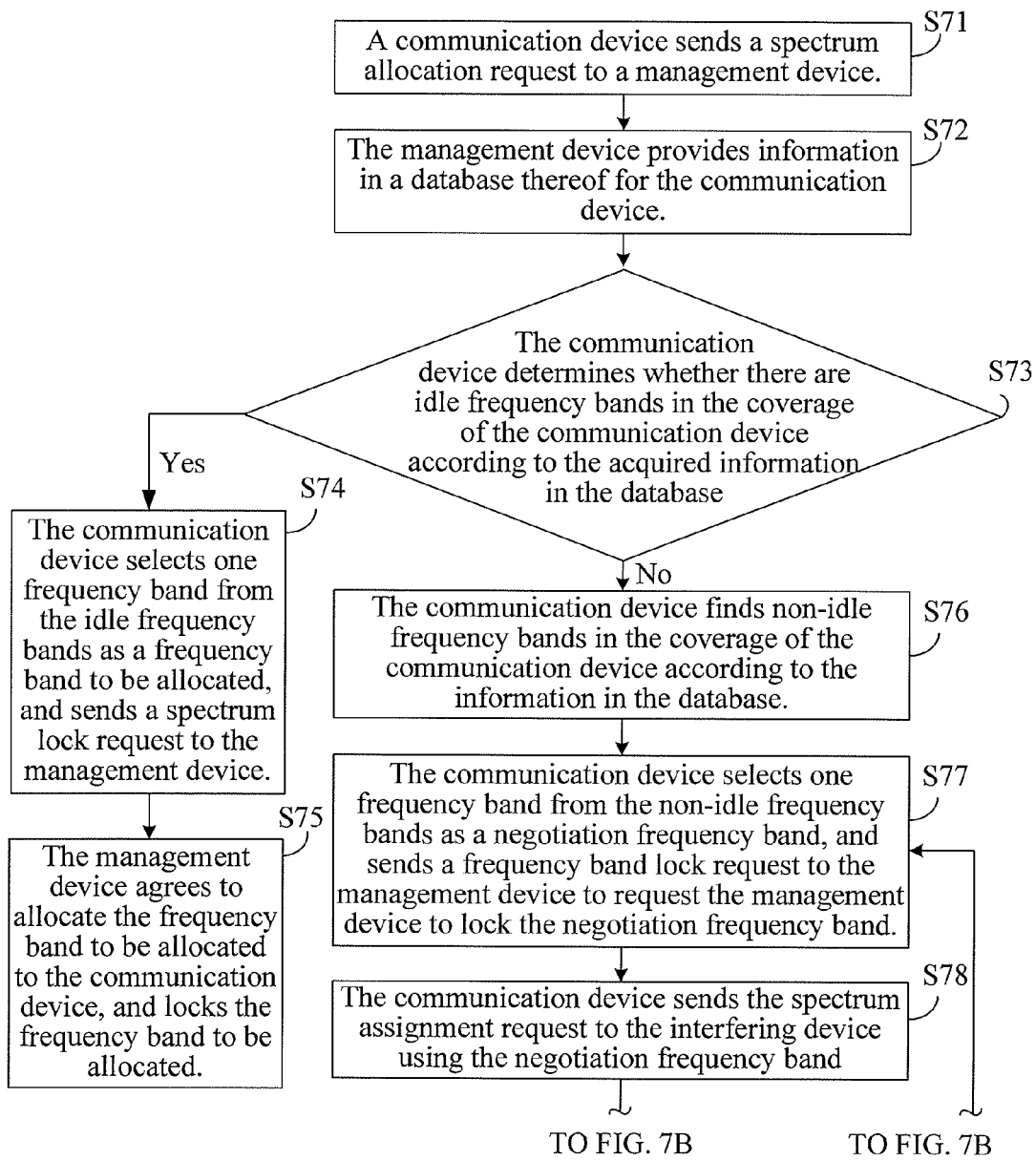
FIG. 7A and FIG. 7B are a schematic flow chart of another dynamic spectrum allocation method according to Embodiment 4 of the present invention.
Figure 7B:
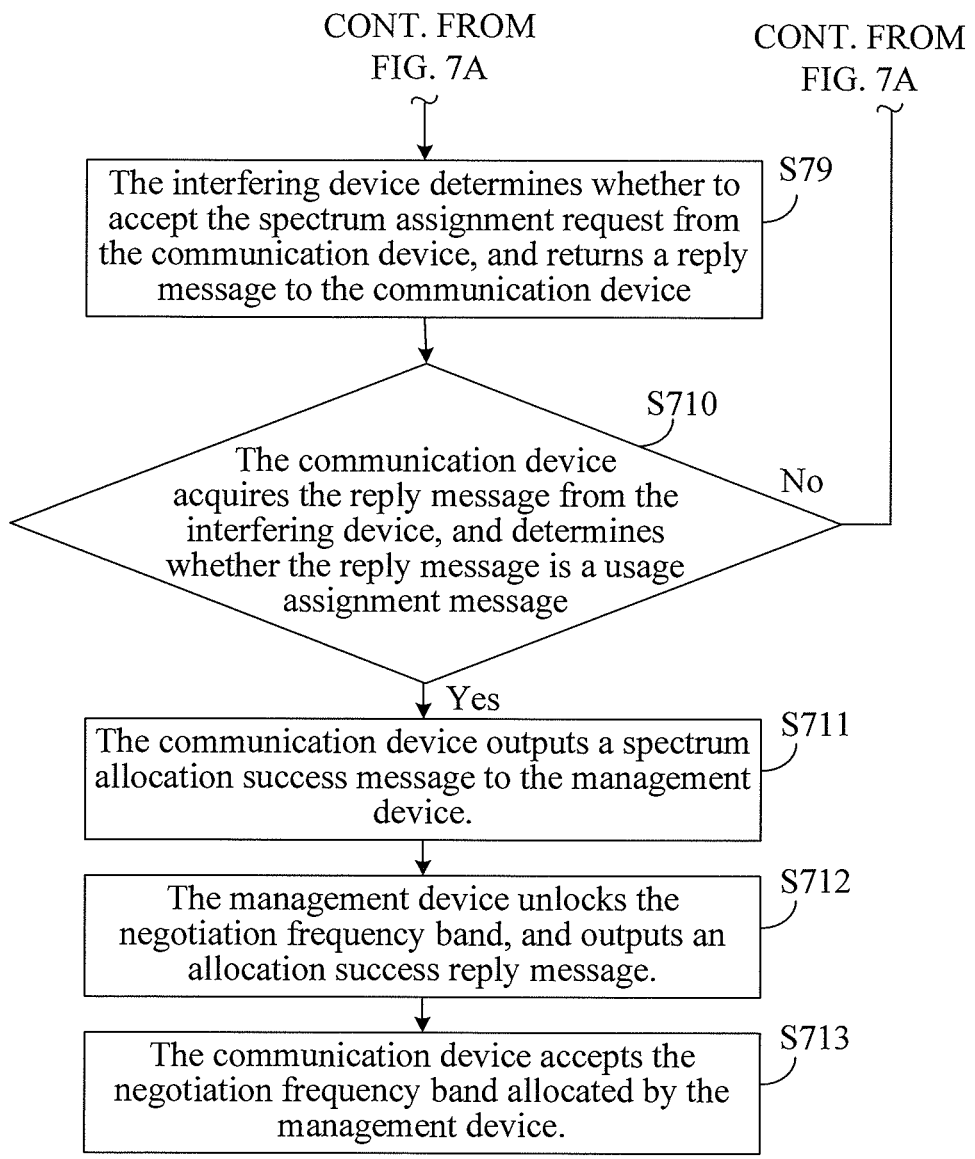

FIG. 7A and FIG. 7B are a schematic flow chart of another dynamic spectrum allocation method according to Embodiment 4 of the present invention, and the method includes the following steps.

Step S71: A communication device sends a spectrum allocation request to a management device.

The communication device sends the spectrum allocation request to the management device when the communication device needs to use spectrum resources, and may inform the management device of a bandwidth required to be allocated when sending the spectrum allocation request.

Step S72: The management device provides information in a database for the communication device.

The management device may find the information of the communication device in the database, and provide the communication device with information such as a use situation of channels in the coverage of the communication device and a situation of interfering devices.

Step S73: The communication device determines whether there are idle frequency bands in the coverage of the communication device according to the acquired information in the database. If there are idle frequency bands in the coverage of the communication device, the procedure proceeds to step S74; if there are not idle frequency bands in the coverage of the communication device, the procedure proceeds to step S76.

In a specific implementation manner, the communication device may find a channel frequency band set in the coverage of the communication device and interfering devices of the communication device according to the information in the database. If at least one interfering device is using a frequency band in the coverage of a communication device, for the communication device, the frequency band is a non-idle frequency band. If a frequency band in the coverage of a communication device is not used by any interfering device of the communication device, for the communication device, the frequency band is an idle frequency band. The above embodiment can be referred to for the definition of the interfering device, which is not repeated hereinafter.

Step S74: The communication device selects one frequency band from the idle frequency bands as a frequency band to be allocated, and sends a spectrum lock request to the management device.

When selecting an idle frequency band, the communication device may select the idle frequency band according to a bandwidth required by the communication device. The above embodiment may be referred to for the detailed selection process, which is not repeated hereinafter. The frequency band selected by the communication device may include multiple channels C1, and each of the channels C1 may include at least one minimum sub-channel C2. The minimum sub-channels C2 may be consecutive or not. It should be understood that, when only one idle frequency band exists, the communication device may determine the only idle frequency band as the frequency band to be allocated.

After selecting the frequency band to be allocated, the communication device may send the spectrum lock request to the management device to request the management device to lock the frequency band to be allocated, so as to prevent the frequency band to be allocated from further being allocated to other devices to use.

Step S75: The management device agrees to allocate the frequency band to be allocated to the communication device, and locks the frequency band to be allocated.

If the management device agrees to allocate the frequency band to be allocated to the communication device, the management device may lock the frequency band, and the locked frequency band can not be allocated to other communication devices. After the management device receives a spectrum allocation request from other devices, the other devices learn from the management device that the frequency band to be allocated is locked, so that the other devices do not participate in the negotiation or allocation of the frequency band, thereby increasing the success rate of the spectrum allocation of the communication device. After successfully locking the spectrum, the management device may update the information in the database, for example, a use record of the idle frequency bands of the communication device or in the corresponding coverage of the communication device in the database. The management device may unlock the frequency band after data updating, so that other devices can continue to participate in the negotiation and allocation of the frequency band.

The communication device can use the allocated frequency band after the management device agrees with the spectrum allocation. If the management device does not agree to allocate the frequency band to be allocated to the communication device, the management device may return a message to the communication device to indicate that the spectrum allocation is not successful, so that the frequency band cannot be allocated to the communication device.

Step S76: The communication device finds non-idle frequency bands in the coverage of the communication device according to the information in the database.

When there is riot any idle frequency band that satisfies the bandwidth demand of the communication device in the coverage of the communication device, a non-idle frequency band in the coverage of the communication device may be found according to the information in the database. As stated in the above embodiment, the non-idle frequency band in the coverage of the communication device is being used by at least one interfering device of the communication device. It should be understood that the number of the non-idle frequency bands meeting the requirements may be multiple.

Step S77: The communication device selects one frequency band from the non-idle frequency bands as a negotiation frequency band, and sends a frequency band lock request to the management device to request the management device to lock the negotiation frequency band.

When the number of the non-idle frequency bands is one, the communication device may directly determine the non-idle frequency band as the negotiation frequency band; and when the number of the non-idle frequency bands is multiple, the communication device may select one of the frequency bands as the negotiation frequency band. The communication device sends a spectrum assignment request to an interfering device using the negotiation frequency band. Preferably, the management device may acquire the number of interfering devices using the non-idle frequency bands or the frequency of use of the non-idle frequency bands by the interfering devices according to the information in the database, and select a non-idle frequency band used by the fewest interfering devices or with the lowest use frequency by the interfering devices as the negotiation frequency band. The use frequency of the selected negotiation frequency band is low, which increases the probability of success of the negotiation and shortens the negotiation time.

In an implementation manner, the communication device may request the negotiation frequency band to be locked, the locked frequency band can not be allocated to other devices, and other devices do not participate in the negotiation or allocation of the locked frequency band either, thereby increasing the success rate of the frequency band negotiation of the communication device. In another implementation manner, the frequency band lock request sent by the communication device to the management device may designate the device to be locked, and after the locking is successfully performed, other devices cannot lock the device already locked by the communication device. For example, a device A intends to use a frequency band, initiates negotiation with devices B and C using the frequency band, and locks the devices B and C. If a device D also intends to use the frequency band, the device D is also required to negotiate with the devices B and C, and lock the devices B and C. The locking performed by the device D may fail, since the devices B and C are already locked by the device A, which means that the efforts made by the device D to negotiate licenses of the frequency band are in vain. According to the implementation manner, other devices are effectively prevented from interfering with the device negotiating the frequency band, thereby increasing the efficiency and the success rate of the negotiation of the frequency band.

Step S78: The communication device sends the spectrum assignment request to the interfering device using the negotiation frequency band.

The communication device may send the spectrum assignment request to the interfering device after the management device successfully locks the negotiation frequency band. If the management device fails to lock the negotiation frequency band, the communication device may re-select a negotiation frequency band, and initiate a negotiation process.

In a specific implementation, the frequency band may not be locked successfully, in which case other devices may be negotiating the licenses of the frequency band, the communication device cannot negotiate the licenses of the frequency band for the moment, and the communication device can re-select a non-idle frequency band and initiate a negotiation process.

Step S79: The interfering device determines whether to accept the spectrum assignment request from the communication device, and returns a reply message to the communication device.

In a specific implementation manner, after acquiring the spectrum assignment request, the interfering device determines whether to accept the spectrum assignment request according to a use time and a bandwidth of the negotiation frequency band. A process of the interfering device determining whether to accept the spectrum assignment request is already described in the above embodiment, which is not repeated hereinafter. The interfering device may allow the communication device to use the negotiation frequency band or not. When the interfering device allows the communication device to use the negotiation frequency band, the interfering device may stop using the negotiation frequency band, so as not to interfere with the communication device.

Step S710: The communication device acquires the reply message from the interfering device, and determines whether the reply message is a usage assignment message. If the reply message is a usage assignment message, the procedure proceeds to step S711; if the reply message is not a usage assignment message, the procedure returns to step S77.

Step S711: The communication device outputs a spectrum allocation success message to the management device.

Normally, the communication device is required to negotiate with multiple interfering devices using the negotiation frequency band. After receiving usage assignment sent by the multiple interfering devices, which indicates that all of the interfering devices participating in the negotiation agree with the spectrum allocation, the communication device outputs the spectrum allocation success message.

Step S712: The management device unlocks the negotiation frequency band, and outputs an allocation success reply message.

The management device receives the allocation success message from the communication device, and unlocks the negotiation frequency band, so that other devices can participate in the negotiation and allocation of the frequency band. The management device may further update the information in the database thereof, and the content of the database updated by the management device may include: the information of the negotiation frequency band and a situation of the communication device using the negotiation frequency band.

Step S713: The communication device accepts the negotiation frequency band allocated by the management device.

The communication device receives the output allocation success reply message, and learns that the management device allows the communication device to use the negotiation frequency band. The communication device may accept the allocation result, and start to use the successfully allocated negotiation frequency band or provide the negotiation frequency band for other devices to use.

In a specific implementation, the reply messages received by the communication device from the multiple interfering devices include a reject message, which indicates that at least one interfering device does not allow the communication device to use the frequency band currently being used by the interfering device, so it is determined that the negotiation process fails, and the communication device cannot use the negotiation frequency band. In this case, the communication device may re-select a non-idle frequency band, and initiate a negotiation process.

In this embodiment, the communication device may negotiate multiple non-idle frequency bands in sequence, and may re-initiate the negotiation continuously if the previous negotiation is not successful. Specifically, the communication device may record a set $S_0$ of multiple non-idle frequency bands in the coverage of the communication device, and find in the set $S_0$ a frequency band used by the fewest interference devices or with the lowest use frequency by the interference devices to negotiate. If the negotiation succeeds, the frequency band of the successful negotiation is allocated to the communication device, and if the negotiation fails, the frequency band is deleted from the set $S_0$, and a frequency band used by the fewest interference devices or with the lowest use frequency by the interference devices continues to be found in the set $S_0$ to negotiate, until all of the frequency bands in the set $S_0$ fail in the negotiation, in which case the management device outputs a spectrum allocation failure message to the communication device. It should be understood that, the frequency band in the embodiment may include multiple channels, and each of the channels may include at least one minimum sub-channel. The minimum sub-channel may be a smallest unit of the dynamic spectrum allocation.

In this embodiment, the communication device finds an idle frequency band in the coverage of the communication device according to the information in the database, and requests the management device to allocate the idle frequency band to the communication device to communicate. If there is not any idle frequency band in the coverage, the communication device may find a non-idle frequency band, negotiate with other devices using the non-idle frequency band, and request the management device to allocate the frequency band by the successful negotiation to the communication device after acquiring the usage assignment of the other devices. The communication device is not required to detect a use situation of surrounding channels, the implementation is simple, and the complexity of the dynamic spectrum allocation is decreased.

Embodiment 5

Figure 8:
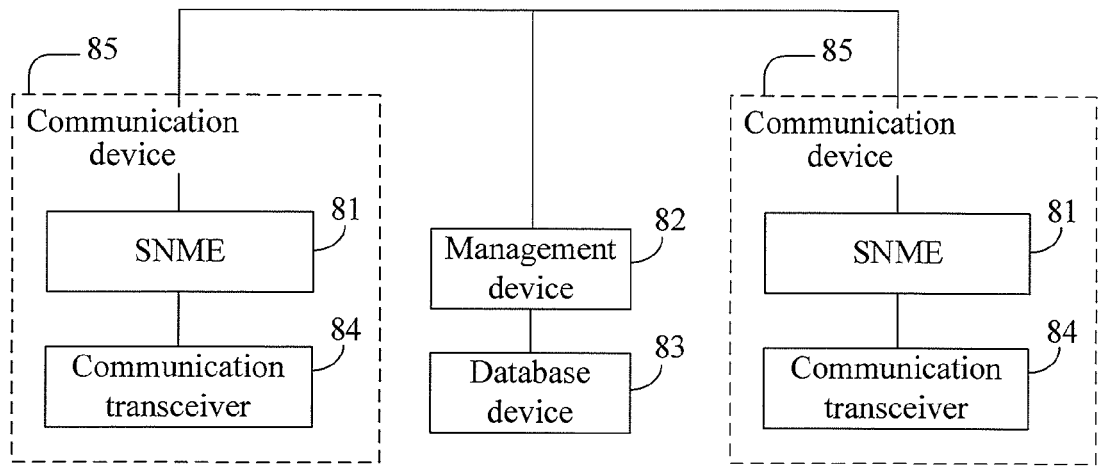
FIG. 8 is a schematic diagram of a dynamic spectrum allocation system according to Embodiment 5 of the present invention.

Embodiment 5 of the present invention further provides a schematic diagram of a dynamic spectrum allocation system, and the system includes a management device and at least one communication device. The at least one communication device is connected to the management device through a network, and the communication devices are connected to each other through the network. Specifically, information exchange between the communication devices or between the communication device and the management device can be performed through the Transmission Control Protocol/Internet Protocol (TCP/IP). As shown in FIG. 8, the management device 82 may be connected to a database device 83. The database device 83 may store the information of each communication device 85, such as a use situation of channels in the coverage of each communication device 85. The management device 82 may acquire the information in the database by querying the database device 83. The communication device 85 is normally a fixed device or a mobile device. The communication system may allocate spectrum resources by using the method described in the above embodiment.

In an implementation manner, the communication device connected to the management device and configured to perform frequency band negotiation may be a Spectrum Negotiation and Management Entity (SNME). Also taking FIG. 8 for example, the SNME 81 and the management device 82 perform spectrum negotiation and allocation. After the spectrum allocation succeeds, the SNME 81 may inform a communication transceiver 84 connected to the SNME 81. A function of the SNME 81 is to realize the spectrum negotiation and allocation. After the spectrum allocation succeeds, the communication transceiver 84 may communicate by using an allocated frequency band. The communication transceiver 84 may be a base station, and the function is to use the frequency band successfully allocated by the SNME 81 to send and receive information. It should be understood that, the number of the communication transceiver 84 connected to each of the SNMEs 81 may be multiple. The SNME 81 maybe a separate communication device only responsible for the spectrum negotiation and allocation, or may be integrated in the communication device 85 together with the communication transceiver 84. When the SNME 81 and the communication transceiver 84 are integrated in the communication device 85, the communication device 85 has a function of spectrum allocation and a function of using a successfully allocated frequency band to perform communication at the same time. The communication device 85 may use the method described in the above embodiment to perform the spectrum negotiation and allocation, and use a successfully allocated frequency band to communicate with other communication devices 85. The communication device 85 may be a fixed or mobile communication device, such as a base station or a relay base station.

Embodiment 6

Figure 9:
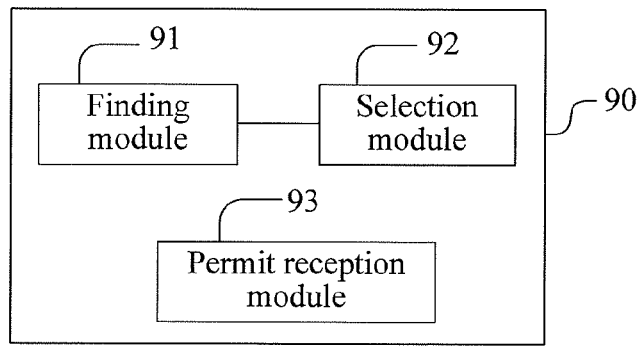
FIG. 9 is a schematic structure diagram of a dynamic spectrum allocation device according to Embodiment 6 of the present invention.

FIG. 9 is a schematic structure diagram of a dynamic spectrum allocation device 90 according to Embodiment 6 of the present invention. The dynamic spectrum allocation device 90 may include:

a finding module 91, configured to find non-idle frequency bands in the coverage of a communication device according to information in a database;

a selection module 92, configured to select a frequency band from the non-idle frequency bands as a negotiation frequency band, and send a spectrum assignment request to an interfering device using the negotiation frequency band; and a permit reception module 93, configured to acquire usage assignment of the interfering device, in which the usage assignment is a response to the spectrum assignment request.

In this embodiment, the dynamic spectrum allocation device finds the non-idle frequency bands in the coverage of the communication device according to the information in the database, and initiates negotiation with the interfering device using the non-idle frequency band to acquire licenses of the non-idle frequency band, thereby facilitating dynamic spectrum allocation, and meeting demands of a spectrum from the communication device.

Furthermore, the selection module 92 maybe further configured to re-select a frequency band from the non-idle frequency bands as a negotiation frequency band after acquiring a reject message from the interfering device, and send a spectrum assignment request to an interfering device using the re-selected negotiation frequency band. The selection module 92 may re-select a frequency band to negotiate when the spectrum negotiation is not successful, until the dynamic spectrum allocation device acquires spectrum resources required by the dynamic spectrum allocation device.

Figure 10:
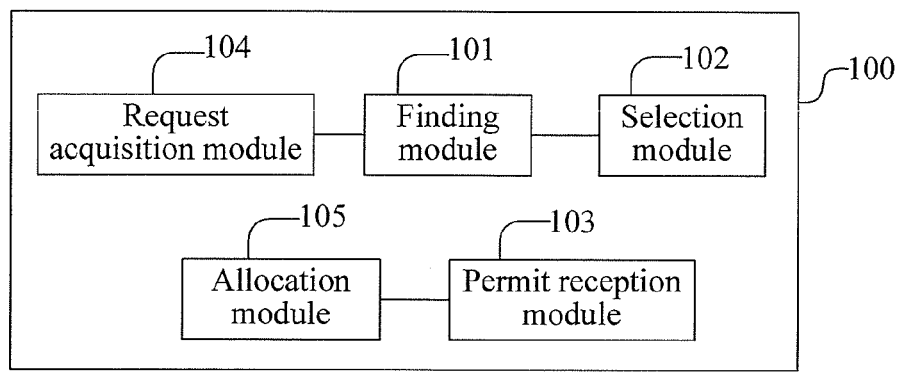
FIG. 10 is a schematic structure diagram of a management device according to Embodiment 6 of the present invention.

In an implementation manner, the dynamic spectrum allocation device may be a management device. FIG. 10 is a schematic structure diagram of a management device 100 according to Embodiment 6 of the present invention. Similar to that in FIG. 9, the management device 100 may include a finding module 101, a selection module 102, and a permit reception module 103, and the management device 100 may further include:

a request acquisition module 104, configured to acquire a spectrum allocation request from the communication device; and an allocation module 105, configured to allocate the negotiation frequency band to the communication device after the usage assignment of the interfering device is acquired.

Furthermore, the management device 100 may further include: an update module, configured to update the information of the negotiation frequency band in the database after the usage assignment of the interfering device is acquired. The management device updates the information in the database, so as to guarantee the accuracy of the information in the database.

Figure 11:
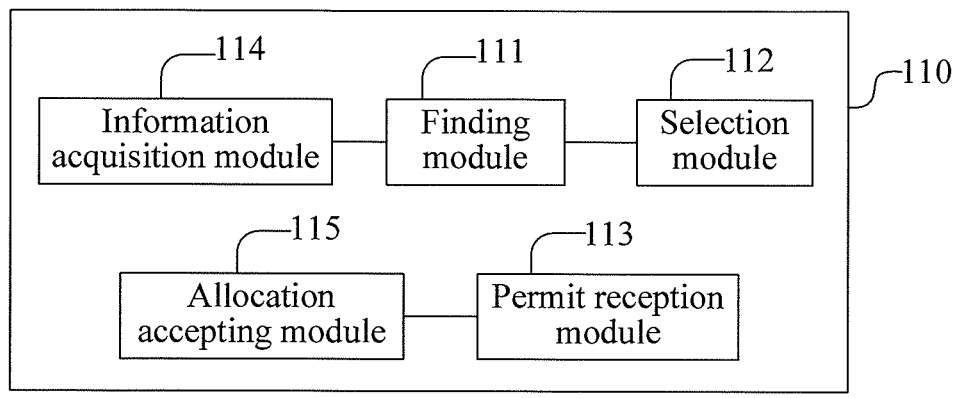
FIG. 11 is a schematic structure diagram of a communication device according to Embodiment 6 of the present invention.

In another implementation manner, the dynamic spectrum allocation device may be a communication device. FIG. 11 is a schematic structure diagram of a communication device 110 according to Embodiment 6 of the present invention. Similar to that in FIG. 9, the communication device 110 may include a finding module 111, a selection module 112, and a permit reception module 113, and the communication device 110 may further include:

an information acquisition module 114, configured to acquire the information in the database; and an allocation accepting module 115, configured to accept the negotiation frequency band allocated by a management device after the usage assignment of the interfering device is acquired.

Furthermore, the communication device 110 may include: a locking module, configured to send a lock request to the management device to request the negotiation frequency band to be locked. After the negotiation frequency band is locked, other devices do not participate in the negotiation and allocation of the negotiation frequency band, thereby increasing the success rate of the spectrum allocation of the communication device 110. The communication device 110 may be a fixed or mobile communication device, such as a base station or a relay base station.

Embodiment 7

Figure 12:
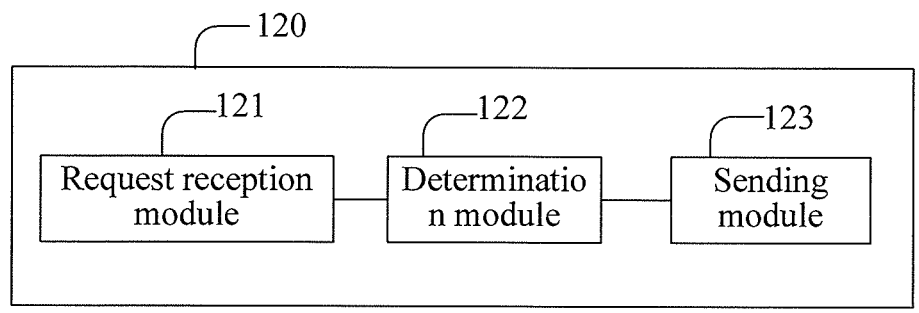
FIG. 12 is a schematic structure diagram of a communication device according to Embodiment 7 of the present invention.

FIG. 12 is a schematic structure diagram of a communication device 120 according to Embodiment 7 of the present invention. The communication device 120 includes:
- a request reception module 121, configured to acquire a spectrum assignment request, in which the spectrum assignment request includes information of a negotiation frequency band;
- a determination module 122, configured to determine whether to accept the spectrum assignment request according to a use time and a bandwidth of the negotiation frequency band currently being used; and
- a sending module 123, configured to send usage assignment when the spectrum assignment request is accepted.

In this embodiment, the communication device 120 may acquire the spectrum assignment request from other communication devices or the management device, and determine whether to allow the requester to use the frequency band according to the use time and the bandwidth of the negotiation frequency band, thereby decreasing the probability of the communication device occupying a large quantity of frequency bands for a long period of time, improving fairness of the spectrum allocation, and meeting demands of a spectrum from the other communication devices.

Furthermore, the determination module 122 further includes:
- a judgment unit, configured to determine whether a product of the use time and the bandwidth of the negotiation frequency band currently being used is greater than a threshold; and
- a determination unit, configured to accept the spectrum assignment request when the result of multiplying the use time with the bandwidth of the negotiation frequency band is greater than the threshold.

The determination module 122 determines whether to allow the requester to use the spectrum currently being used by the communication device by determining whether the result of multiplying the use time with the bandwidth of the negotiation frequency band currently being used is greater than the threshold, thereby decreasing the probability of the communication device occupying a large quantity of frequency bands for a long period of time. In this embodiment, after allowing the requester to use the negotiation frequency band, the communication device 120 may stop using the negotiation frequency band, so as not to interfere with other devices. The communication device 120 may be a fixed or mobile communication device, such as a base station or a relay base station.

According to the embodiments, the dynamic spectrum allocation method, system, and device are applicable to any dynamic spectrum allocation process. In a typical dynamic spectrum allocation application, devices in the system may acquire licenses of a part of spectrum resources in TV white space by allocating the TV white space by negotiation. A device that acquires the licenses of the dynamic spectrum resources may transfer the acquired licenses to other devices, or share the acquired licenses with other devices. Existing measurements indicate that, in most areas, existing radio/TV frequency bands are not completely occupied, and multiple idle TV frequency bands can always be found. According to the embodiments, the dynamic spectrum allocation scheme may allocate vacant channels to a communication device reasonably, so as to effectively use idle TV frequency band resources.

Based on the above, according to the embodiments of the present invention, a non-idle frequency band being used is selected according to information in a database, and negotiation is performed with an interfering device using the frequency band to acquire licenses of the frequency band, which meets demands of the spectrum from a communication device, and is simple to implement.

Persons of ordinary skill in the art should understand that all or a part of the steps of the method according to the embodiments of the present invention may be implemented by a computer program instructing the hardware. The program may be stored in a computer readable storage medium. When the program is run, the steps of the method according to the embodiments of the present invention are performed. The storage medium may be a magnetic disk, an optical disk, a Read-Only Memory (ROM), or a Random Access Memory (RAM).

The above descriptions are merely embodiments of the present invention, and modifications and variations can be made to the present invention by persons skilled in the art according to the specification without departing from the spirit and scope of the present invention. It should be understood by persons skilled in the art that, the technical solutions of the embodiments can form new embodiments by combination without conflicts.

What is claimed is:

1. A dynamic spectrum allocation method, comprising:
    finding at least a non-idle frequency band in the coverage of a communication device according to information in a database;
    selecting a frequency band from the at least a non-idle frequency band as a negotiation frequency band, and sending a spectrum assignment request to an interfering device using the negotiation frequency band; and
    acquiring usage assignment of the interfering device, wherein the usage assignment is a response to the spectrum assignment request.

2. The method according to claim 1, wherein before the finding the at least a non-idle frequency band in the coverage of the communication device according to the information in the database, the method further comprises: acquiring a spectrum allocation request from the communication device; and
    after the acquiring the usage assignment of the interfering device, the method further comprises: allocating the negotiation frequency band to the communication device.

3. The method according to claim 2, wherein after the acquiring the usage assignment of the interfering device, the method further comprises:
    updating information of the negotiation frequency band in the database.

4. The method according to claim 1, wherein before the finding the at least a non-idle frequency band in the coverage of the communication device according to the information in the database, the method further comprises: acquiring the information in the database; and
    after the acquiring the usage assignment of the interfering device, the method further comprises: accepting the negotiation frequency band allocated by a management device.

5. The method according to claim 4, further comprising:
sending a lock request to the management device to request the negotiation frequency band to be locked.

6. The method according to claim 1, further comprising:
after acquiring a reject message from the interfering device, re-selecting a frequency band from the at least a non-idle frequency band as another negotiation frequency band, and sending a spectrum assignment request to an interfering device using the re-selected negotiation frequency band.

7. A dynamic spectrum allocation method, comprising:
acquiring a spectrum assignment request, wherein the spectrum assignment request comprises information of a negotiation frequency band;
determining whether to accept the spectrum assignment request according to a use time and a bandwidth of the negotiation frequency band currently being used; and
sending usage assignment when the spectrum assignment request is accepted.

8. The method according to claim 7, wherein the determining whether to accept the spectrum assignment request according to the use time and the bandwidth of the negotiation frequency band currently being used comprises:
determining whether a result of multiplying the use time with the bandwidth of the negotiation frequency band currently being used is greater than a threshold; and
accepting the spectrum assignment request when the result of multiplying the use time with the bandwidth of the negotiation frequency band is greater than the threshold.

9. A dynamic spectrum allocation device, comprising:
a finding module, configured to find at least a non-idle frequency band in the coverage of a communication device according to information in a database;
a selection module, configured to select a frequency band from the at least a non-idle frequency band as a negotiation frequency band, and send a spectrum assignment request to an interfering device using the negotiation frequency band; and
a permit reception module, configured to acquire usage assignment of the interfering device, wherein the usage assignment is a response to the spectrum assignment request.

10. The dynamic spectrum allocation device according to claim 9, wherein the dynamic spectrum allocation device is a management device, and further comprises:
a request acquisition module, configured to acquire a spectrum allocation request from the communication device; and
an allocation module, configured to allocate the negotiation frequency band to the communication device after the usage assignment of the interfering device is acquired.

11. The dynamic spectrum allocation device according to claim 10, further comprising:
an update module, configured to update information of the negotiation frequency band in the database after the usage assignment of the interfering device is acquired.

12. The dynamic spectrum allocation device according to claim 9, wherein the dynamic spectrum allocation device is a communication device, and further comprises:
an information acquisition module, configured to acquire the information in the database; and
an allocation accepting module, configured to accept the negotiation frequency band allocated by a management device after the usage assignment of the interfering device is acquired.

13. The dynamic spectrum allocation device according to claim 12, further comprising:
a locking module, configured to send a lock request to the management device to request the negotiation frequency band to be locked.

14. The dynamic spectrum allocation device according to claim 9, wherein the selection module is further configured to re-select a frequency band from the at least a non-idle frequency band as another negotiation frequency band after acquiring a reject message from the interfering device, and send a spectrum assignment request to an interfering device using the re-selected negotiation frequency band.

15. A communication device, comprising:
a request reception module, configured to acquire a spectrum assignment request, wherein the spectrum assignment request comprises information of a negotiation frequency band;
a determination module, configured to determine whether to accept the spectrum assignment request according to a use time and a bandwidth of the negotiation frequency band currently being used; and
a sending module, configured to send usage assignment when the spectrum assignment request is accepted.

16. The communication device according to claim 15, wherein the determination module comprises:
a judgment unit, configured to determine whether a result of multiplying the use time with the bandwidth of the negotiation frequency band currently being used is greater than a threshold; and
a determination unit, configured to accept the spectrum assignment request when the result of multiplying the use time with the bandwidth of the negotiation frequency band is greater than the threshold.

* * * * *